United States Patent [19]
Subramaniam et al.

[11] Patent Number: 6,004,590
[45] Date of Patent: *Dec. 21, 1999

[54] PROCESS FOR PRODUCING DEHYDRATED VEGETABLES

[75] Inventors: Persis Jebakumari Subramaniam, New Malden; Iain Cunningham Mutter Dea, Guilford; Sylvia Anna Jones, London, all of United Kingdom

[73] Assignee: Bestfoods, Englewood Cliffs, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/677,702

[22] Filed: Jul. 10, 1996

[30] Foreign Application Priority Data

Jul. 18, 1995 [GB] United Kingdom .................. 9514646

[51] Int. Cl.$^6$ ...................................................... A23B 7/10
[52] U.S. Cl. ............................. 426/50; 426/49; 426/237; 426/241; 426/242; 426/640
[58] Field of Search .................................. 426/49, 50, 51, 426/237, 238, 241, 242, 615, 640

[56] References Cited

U.S. PATENT DOCUMENTS

| | | | |
|---|---|---|---|
| 2,534,263 | 12/1950 | Hills | 99/103 |
| 3,904,774 | 9/1975 | Dymsza | 426/321 |
| 4,330,946 | 5/1982 | Courneya | 34/1 |
| 4,361,589 | 11/1982 | Wauters et al. | 426/270 |
| 4,418,083 | 11/1983 | McKinney et al. | 426/242 |
| 4,542,033 | 9/1985 | Agarwala | 426/321 |
| 4,622,757 | 11/1986 | Bernstein et al. | 34/1 |
| 4,640,020 | 2/1987 | Wear et al. | 34/1 |
| 4,664,924 | 5/1987 | Sugisawa et al. | 426/242 |
| 4,746,968 | 5/1988 | Wear et al. | 219/10.55 |
| 4,889,730 | 12/1989 | Roberts et al. | 426/102 |
| 5,000,972 | 3/1991 | Nafisi-Movaghar | 426/333 |
| 5,020,237 | 6/1991 | Gross et al. | 34/1 |
| 5,053,232 | 10/1991 | Balestrieri et al. | 426/49 |
| 5,113,597 | 5/1992 | Sylla | 34/22 |
| 5,135,122 | 8/1992 | Gross et al. | 219/10.55 |
| 5,380,189 | 1/1995 | Clary et al. | 426/438 |
| 5,645,876 | 7/1997 | Subramaniam et al. | 426/50 |

FOREIGN PATENT DOCUMENTS

| | | |
|---|---|---|
| 0221489 | 10/1986 | European Pat. Off. . |
| 0 337 621 A1 | 3/1989 | European Pat. Off. . |
| 0404543 | 6/1989 | European Pat. Off. . |
| 0413071 | 8/1989 | European Pat. Off. . |
| 0407299 | 7/1990 | European Pat. Off. ........ A23B 7/153 |
| 0546350 | 11/1992 | European Pat. Off. ........ A23B 7/022 |
| 0663152 | 1/1995 | European Pat. Off. . |
| 2182234 | 4/1973 | France . |
| 2713935 | 10/1977 | Germany . |
| 1067967 | 4/1965 | United Kingdom . |
| 1579392 | 3/1976 | United Kingdom . |

OTHER PUBLICATIONS

MIVAC, A Natural Food De–Hydration Process, Pitt–DesMoines, Inc. Sales Literature.

MIVAC, Dried Foods Technology, Pitt–DesMoines, Inc. Sales Brochure.

Microwave/Vacuum Convective Drying of Foodstuffs, by A. Heindl, W. Holley, D. Rehmann, Munich, pp. 1–14.

*Primary Examiner*—Leslie Wong
*Attorney, Agent, or Firm*—Ellen Plotkin

[57] ABSTRACT

A process for producing dehydrated vegetables including preparing the vegetables, holding the prepared vegetables for a time and at a temperature to activate pectinmethylesterase (PME), blanching and drying. The drying includes exposure to microwave radiation at a pressure below atmospheric pressure. The invention also provides dehydrated vegetable matter obtainable by the process, a dried food product reconstitutable with aqueous liquids which includes the vegetable matter, and the product when so reconstituted.

13 Claims, No Drawings

PROCESS FOR PRODUCING DEHYDRATED VEGETABLES

FIELD OF THE INVENTION

This invention relates to a process for producing dehydrated vegetables, to the dehydrated vegetable matter obtained thereby, and to dried food products reconstitutable with water which contain the dehydrated vegetable matter.

BACKGROUND OF THE INVENTION

Dehydrated vegetables are used widely in products such as soups and other processed foods, often in dehydrated, diced form. The major problem associated with dehydrated vegetables is that, on rehydration, they often remain collapsed and shrunk, giving rise to a product of poor texture relative to the textural quality of the fresh or minimally processed vegetables. The irreversible shrinkage that occurs during drying is due to the collapse of the cell-wall structure.

Pectin is a major component of vegetable cell walls and, as such, makes a major contribution to the structural integrity and strength of vegetables and vegetable pieces. Native pectin is, generally, high methoxyl in structure and, as a result, is susceptible to degradation on heating under neutral pH conditions. This form of degradation occurs during cooking and is the major reason for unwanted textural softening of vegetables on heat processing. During forced-air drying of vegetable pieces, water is removed, thus releasing the turgor pressure and causing the cell wall structure to collapse. The collapse can be irreversible, if the moisture content of the materials is very high or if the cell wall structure is weak. In these cases, rehydration only causes the absorption of water into the intercellular spaces, thus leading to poor rehydratability of the dehydrated material and poor texture on rehydration.

Vegetables contain pectinmethylesterase (PME) in their cell walls. This endogenous enzyme can be activated by mild heat treatment under specific conditions of pH and ionic strength and, when activated, leads to demethoxylation of the native pectin. The resulting demethoxylated pectin has a structure that is more stable against degradation on heating at neutral pH and that more effectively cross-links in the presence of calcium ions. Both of these factors lead to the strengthening of the cell wall structure and pretreatments that activate the PME enzyme in vegetables have been shown to give improved texture after freezing and canning.

EP-A-0337621 discloses a method for producing dried fruit which involves stabilizing the color and flavor of the fruit by infusing it in a 10 to 70% carbohydrate solution prior to drying.

EP-A-0404543 also describes a process for preparing dried fruit which includes infusion in an aqueous carbohydrate solution. This document teaches that the fruit must be soaked under conditions which deactivate the enzymes and also soften the fruit prior to dehydration.

Our related application, EP-A-0663152, published on Jul. 19, 1995, is based on the finding that improved textural qualities on rehydration may be obtained for dehydrated vegetables by preheating the vegetables to activate endogenous PME before blanching and drying. This effect is believed to be a result of the preservation of the cell wall structure due to the demethoxylation of pectin.

It has now been found that an improved dehydrated vegetable product can be obtained if the above-mentioned pretreatment to activate PME is used in conjunction with microwave-vacuum drying techniques.

Therefore, an object of the present invention is to provide an improved process for dehydrating vegetable matter.

Another object of the present invention is to provide dehydrated vegetable matter having good rehydratability.

A further object of the present invention is to provide dehydrated vegetable matter having good texture and flavor upon rehydration.

SUMMARY OF THE INVENTION

Accordingly, the present invention provides a process for producing dehydrated vegetables comprising preparing the vegetables, holding the prepared vegetables for a time and at a temperature to activate pectinmethylesterase (PME), blanching and drying. The drying comprises exposure to microwave radiation at a pressure below atmospheric pressure. The invention also provides dehydrated vegetable matter obtainable by the process, a dried food product reconstitutable with aqueous liquids which comprises the vegetable matter and the product when so reconstituted. The product has good properties in terms of its texture and flavor and has a higher rate of rehydration than the product produced when the pretreatment is used with air-drying methods (i.e., drying carried out at atmospheric pressure) or non-microwave techniques.

DETAILED DESCRIPTION

The term "vegetable(s)," as used herein, is intended to cover all edible material of plant origin including root or tuber, leaves, seeds, stalk and fruit. The vegetables may be from one source or a mixture and are preferably root or tuber, stalk or fruit. Preferably the vegetables contain pectinmythylesterase (PME) but, if no PME is naturally present or if it is present in only a small quantity, the vegetables may be treated with exogenous PME such as by vacuum infusion for example. Suitable vegetables include carrot, tomato, potato, celery and bell pepper (both green and red).

Activation of the endogenous PME is generally carried out by holding the vegetable matter at an elevated temperature. The pH conditions, the temperature range and the time for which the material is held in that range to effect activation varies with the vegetable used and the optimum conditions required in each specific case may be determined if the optimal conditions to promote PME activity in the vegetable is known. The conditions and methods for their determination will be well-known to those skilled in the art. Generally, the vegetable pieces are held in water or an aqueous solution at a pH of from 6 to 8 at a temperature of from about 45 to about 70° C. for from about 10 to about 60 minutes. For carrot, bell pepper, celery, potato and tomato, the optimum conditions are about 60° C. for about 40 minutes, about 60° C. for about 30 minutes, about 60° C. for about 15 minutes, about 60° C. for about 30 minutes and about 50° C. for about 15 minutes, respectively. Suitable conditions for the activation of exogenous PME will, of course, depend on the enzyme used.

The vegetables used in the present invention may be the whole or any part of the whole vegetable and are prepared in conventional ways well-known in the art. The vegetables may be treated by cutting to any size as required by their end use. Preferably, the vegetables are diced and have dimensions of from about 5 to about 15 mm. Typically, the vegetables may be prepared by washing, peeling and dicing the fresh vegetables.

In a preferred embodiment of the invention, the vegetables are infused with an aqueous infusion solution comprising from about 20 to about 70% by weight of one or more carbohydrates and, optionally, up to about 5.0% by weight of a calcium salt (e.g., from about 0.5% to about 5.0%). The infusion may be carried out before, during or after the holding treatment but is preferably carried out either after the holding treatment or during the holding treatment by carrying out the holding treatment in the infusion solution. The infusion treatment causes osmotic dehydration and, therefore, aids drying. The infusion step has also been found to contribute to strengthening the cell wall structure against collapse during the drying process. The carbohydrates are preferably monosaccharides or disaccharides since it is preferred that they have a relatively low molecular weight to permit ready infusion into the vegetable tissue. The most preferred carbohydrates are glucose, sucrose, fructose and mixtures thereof. Any edible calcium salt having a sufficiently high solubility to provide a 0.5 to 5.0% solution of the salt in the infusion solution may be used in the invention. Suitable salts include calcium chloride, calcium lactate and mixtures thereof. The infusion solution may include other substances, such as sodium chloride (up to about 10%) that promote osmotic dehydration, and other flavorants or preservatives that do not affect the performance of the invention. The infusion solution may also contain exogenous PME.

The infusion of the vegetables may take place at ambient pressure but it may also be carried out under vacuum. Vacuum infusion methods of the type which may be used in the invention are well-known to those skilled in the art. Preferably, vacuum infusion is carried out by subjecting the vegetable matter in the infusion solution to a vacuum of from 1.33 to 5.33 kPa (10 to 40 mmHg) for a period of from about 1 to 10 minutes. A typical vacuum infusion process involves holding the vegetable matter in the infusion solution, applying a vacuum of about 20 mmHg for about 5 minutes, slowly releasing the vacuum and holding for a further 5 minutes.

Blanching of the treated vegetable matter may be carried out by the standard commercial treatments which are used prior to dehydration in order to deactivate enzymes that are known to cause deterioration in the quality of the dried products. Suitable blanching treatments include immersion of the vegetable matter in water or an aqueous solution (e.g., a dilute sodium bicarbonate solution) at about 100° C. for from about 1 to about 5 minutes. Preferably, blanching is carried out in the infusion solution. The skilled person will be aware of the blanching conditions which are suitable in any given case.

The treated vegetables are dried, after blanching, by exposure to microwave radiation at a pressure below atmospheric pressure. Suitable methods, apparatus and conditions for carrying out the microwave/vacuum drying step are well-known to those skilled in the art. The condition will, of course, depend on the vegetable which is being dried and how it has been treated. For example, when the vegetable has been infused with a carbohydrate, the microwave drying conditions may need to be modified to avoid or reduce browning in the product. Preferably, the vacuum is maintained at from about 1 to about 5 kPa although it can vary outside this range depending on the power of the microwave source, the time taken for drying, the vegetable used and the pretreatment which it has undergone before blanching.

In a preferred embodiment of the invention, the blanched vegetables are air-dried (i.e., dried at atmospheric pressure) before being dried using the microwave/vacuum drying techniques. This makes the overall drying process more economical and can result in improvements in the texture of the dehydrated vegetable product. The air-drying is preferably carried out so that the vegetables have a moisture content of from about 40 to about 90% of their moisture content after blanching. Air-drying to less than 40% can negate the advantages of the microwave/vacuum drying step and little economic or textural advantage is seen when the moisture content is above 90%.

The microwave/vacuum drying step has a tendency to "puff" the vegetables with a consequent loss of structure in the product when it is rehydrated. By combining the microwave/vacuum drying technique with a pretreatment which involves activation of PME, the texture of the rehydrated product is improved. The texture can be further modified by using a drying step which is a combination of air-drying and microwave/vacuum drying since this allows a reduction in the amount of "puffing" of the product. It will, therefore, be appreciated that the process can be readily manipulated to obtain the desired properties in the product by varying the amount of air-drying relative to microwave/vacuum drying. Air-drying may be carried out in conventional ways preferably at elevated temperatures (e.g., up to about 130° C.).

The following examples illustrate the present invention, and are not meant to be limiting in any way.

EXAMPLES

Materials and Methods Used in the Examples

1. Sample Preparation

| | |
|---|---|
| Potato | The potatoes (Idaho Russett) were peeled and then either diced mechanically to give approximately 10 mm cubes or cut to give pieces of approximate size 25 mm × 38 mm. |
| Carrots | Ready-peeled baby carrots were mechanically diced to give approximately 10 mm cubes. However, owing to the small size of the carrot, a large proportion was found to be of smaller size. |
| Celery | The head and bottom parts of the celery sticks were removed and the sticks cut by hand to give approximately 10 mm pieces. |
| Green/red pepper | The calyx and seeds of the bell peppers were removed before cutting by hand to give approximately 10 mm × 10 mm pieces. |
| Tomato | Firm, red tomatoes were sliced mechanically to give approximately 10 mm slices, which were then cut manually to give approximately 10 mm × 10 mm pieces. |

2. Blanching

Blanching was carried out in a 75-1 steam-jacketed stainless steel vessel. The temperature was 100° C. and blanching times were as follows:

Potato (10 mm cubes)—4 min
Potato (25 mm×38 mm pieces)—8 min
Carrot (10 mm cubes)—4 min
Green/red pepper (10 mm×10 mm pieces)—2 min
Celery (10 mm×10 mm pieces)—4 min
Tomato (10 mm×10 mm pieces)—1 min When pre-treatments were used, blanching was carried out in the same solutions used for the holding treatments. Control samples were blanched in water.

3. Holding Treatment

The holding treatments were carried out by circulating water from a temperature-controlled water bath around a plastic container holding the samples in the pre-treating solution. The temperature control was found to be +/−2° C. during the holding treatment.

4. Vacuum Infusion

Vacuum infusion was carried out in a pilot-scale microwave/vacuum apparatus ("MIVAC"). The samples were held in the treating solution within a plastic container. The process involved pulling a vacuum of 2.66 kPa (20 torr), to evacuate air from the sample pieces, releasing the vacuum slowly to infuse the pieces with the solution and then holding for 10 min in the same solution.

5. Air Drying

Partial air drying of the samples was carried out prior to MIVAC drying. The air drying was carried out in a pilot-scale dryer (Proctor) set with standard flow rate (10.2 m/s). The product conversion belt was maintained at a constant speed to give drying time of 75 minutes throughout all trials. However, the air temperature was varied depending on the size of vegetable pieces.

6. MIVAC Drying

A pilot-scale MIVAC unit was used for microwave-vacuum drying of samples. Batch weights of 0.91 and 1.82 kg (2 and 4 lb) were dried in most cases. The variables used were power level, temperature and time. The vacuum pressure was kept constant at 2.66 kPa (20 torr) throughout all trials.

7. Cooking Tests

Large pieces of potato (25 mm) were boiled in water in a domestic, electrically heated pan for 5 min. These samples were also shallow fried in hot oil for approximately 3–4 min until golden brown.

8. Moisture Content

A minimum of duplicate samples was removed at various stages of processing for moisture content measurement. Moisture content was measured by the vacuum drying method at a temperature of 70° C. Weighed samples were dried overnight to constant weight.

9. Rehydration Tests

Approximately 2–4 g of the 10 mm sized pieces and 5–10 g of the 25–38 mm pieces were used in the test. Rehydration ratios (weight of reconstituted sample/weight of dry sample) were measured under the following conditions:

(a) Boiling water for 5 min (10 mm pieces).
(b) Overnight soaking in cold water in the refrigerator (large potato pieces only).

10. Organoleptic Assessment

All samples were informally assessed for organoleptic quality by one experienced assessor. The attributes assessed were appearance (color, shrinkage), flavor (including off-flavors) and texture (firmness, crunchiness, mealiness, etc. as appropriate).

Example 1

10 mm cubes of potato were pretreated by holding at 60° C. for 30 minutes in a 2% calcium lactate solution. Vacuum infusion was carried out in the same solution, followed by blanching. The pretreated potato cubes were then air dried at 93.3° C. for 75 minutes (reducing the moisture content from 80.71% after pretreatment to 59.18%). The air dried sample (now weighing 1830 g) was dried in the MIVAC apparatus at 73.9° C. using a power of 3000 W for 66 minutes.

The product was found to have a rehydration ratio of 1.83 and, on rehydration, had a crunchy, slightly rubbery texture showing that the pretreatment improves the firmness of the product.

Example 2

Example 1 was repeated, but using a pretreatment solution containing 30% sucrose and 5% sodium chloride and not carrying out a vacuum infusion step. The moisture content after pretreatment was 55.65% and fell to 24.84% after air drying and 5.37% after MIVAC drying.

The dried product had a better appearance than that of Example 1 (possibly due to the absence of calcium lactate) with an orange/yellow color and very little collapse after drying.

The product had a rehydration ratio of 1.64 and, on rehydration, gave a product having a good, bright color and a soft mealy texture similar to that of mashed potato. The flavor was good, being similar to that of roasted potato. The rehydrated product was considered more acceptable than that of Example 1.

Example 3

The effect of using a pretreatment was assessed for 25 mm potato pieces. A first sample was blanched in water and a second sample pretreated according to the invention by holding at 60° C. for 30 minutes in a 30% sucrose/5% sodium chloride solution followed by blanching in the same solution.

Portions of the two samples were air dried to 1800 g weight at 121° C. for 75 minutes and then subjected to MIVAC drying at 73.9° C. using a power of 3000 W for 48 minutes (control) and 27 minutes (pretreated according to the invention).

Unlike the control, the pretreated sample had a good color, showed no shrinkage and had no hard skin on the surface during air drying.

The samples rehydrated on soaking overnight in cold water and had rehydration ratios of 2.33 (control) and 2.04 (pretreated sample). The rehydrated samples were assessed for organoleptic quality after (i) boiling in water for 10 minutes and (ii) shallow frying in hot oil for 3 to 5 minutes. After boiling, and after frying, the pretreated sample was found to have better texture (being mealy and smooth) and flavor than the control.

Example 4

10 mm cubes of carrot were pretreated by holding at 60° C. for 40 minutes in de-ionized water, vacuum infusing a 60% glucose/1% calcium lactate solution and blanching in the same solution.

The pretreated carrot was air dried at 93.3° C. for 75 minutes followed by MIVAC drying (3000 W) 1800 g of the air dried product at 73.9° C. for 75 minutes. The moisture content of the sample was 78.8% after air drying and 7.84% after MIVAC drying. The sample showed little shrinkage.

The product completely rehydrated after 5 minutes and had a rehydration ratio of 1.78. The rehydrated product had a crunchy texture and a good flavor.

Example 5

Example 4 was repeated, but using a pretreatment of holding at 60° C. for 40 minutes in a solution of 60% sucrose/5% sodium chloride and blanching in the same solution.

The moisture content of the sample was 55.69% after air drying and 4.67% after MIVAC drying. Again, there was little shrinkage on drying.

The rehydrated product had the same good texture as the rehydrated product of Example 4, a slightly improved color and a good cooked carrot flavor.

Example 6

10 mm celery pieces were pretreated by holding at 60° C. for 30 minutes in de-ionized water, vacuum infusing with a solution of 60% glucose/1% calcium lactate and then blanching in the same solution.

The pretreated sample was air dried at 93.3° C. for 75 minutes and 1800 g of the air dried product was MIVAC dried at 3000 W and 73.9° C. for 71 minutes. The dried product had an olive green color and retained the shape it had before drying.

The dried product had a rehydration ratio of 1.43 and on rehydration was fleshy and crunchy with a good flavor.

Example 7

Example 6 was repeated but the celery pieces were pretreated by holding at 60° C. for 30 minutes in 30% sucrose/4% sodium chloride solution and blanching in the same solution.

The dried product had a better color but slightly more shrinkage than the corresponding product of Example 6. The rehydration ratio was 1.96 and the rehydrated product had an even better flavor than in Example 6 but, although still crunchy and fleshy, a very slightly inferior texture.

Example 8

Example 7 was repeated using 10 mm green and red pepper pieces, with and without a vacuum infusion step before blanching.

The dried products rehydrated completely after 5 minutes in boiling water with rehydration ratios of about 2.0. In all cases, the rehydrated products had good color and flavor, a fleshy appearance and were slightly crunchy.

Example 9

Example 7 was repeated using 10 mm tomato pieces with a vacuum infusion step before blanching. In the MIVAC drying step, 900 g of the sample was dried at 1600 W and 62.8° C. for 48 minutes. The moisture content fell to 75.24% after air drying and 5.53% after MIVAC drying.

The dehydrated product had a rehydration ratio of 2.84, rehydrated completely after 5 minutes in boiling water and the hydrated product had a soft appearance and a fleshy texture.

The invention now being fully described, it will be apparent to one of ordinary skill in the art that many changes and modifications can be made thereto without departing from the spirit or scope of the invention as set forth herein.

We claim:

1. A process for producing dehydrated vegetables comprising preparing vegetables, holding said prepared vegetables for a time from 10 to 60 minutes and a temperature from 45° to 70° C. to activate pectinmethylesterase and to reduce the moisture content of said prepared vegetables substantially without causing collapse of said prepared vegetables, blanching, and drying, wherein said drying comprises exposure to microwave radiation at a pressure below atmospheric pressure.

2. The process of claim 1, further comprising infusing said prepared vegetables before, during or after said holding treatment in an aqueous infusion solution comprising from 20 to 70% of carbohydrates.

3. The process of claim 2, wherein said infusion solution contains up to 5.0% of a calcium salt.

4. The process of claim 2, wherein said infusion solution comprises up to 10% sodium chloride.

5. The process of claim 2, wherein said carbohydrates are selected from the group consisting of glucose, sucrose, fructose, and combinations thereof.

6. The process of claim 3, wherein said calcium salt is selected from the group consisting of calcium chloride, calcium lactate, and mixtures thereof.

7. The process of claim 2, wherein said holding treatment is carried out in said aqueous solution to effect, at least partially, said infusion of the prepared vegetables.

8. The process of claim 2, wherein said holding treatment is carried out in water and is followed by said infusion step.

9. The process of claim 2, wherein said infusion is carried out under vacuum before or after said holding treatment.

10. The process of claim 1, wherein said vegetables are selected from the group consisting of carrots, celery, bell peppers, tomatoes, and potatoes.

11. The process of claim 1, wherein said drying step comprises air drying followed by exposure to microwave radiation at a pressure below atmospheric pressure.

12. The process of claim 11, wherein said vegetables are air dried to a moisture content of from 40 to 90% of their moisture content before drying.

13. A process for producing a food material, said process comprising the process of claim 1, and including the step of subsequently infusing said dehydrated vegetables with moisture to convert said dehydrated vegetables to a resultant food material having a moisture content in a range bounded by the moisture content of said dehydrated vegetables and the initial moisture content of said vegetables.

* * * * *